United States Patent [19]

Otsuki

[11] Patent Number: 5,455,056

[45] Date of Patent: Oct. 3, 1995

[54] PROCESS FOR PREPARING BEAN JAM

[76] Inventor: Tatsukiyo Otsuki, 9-25, Saiwaicho, Okayama-shi, Japan

[21] Appl. No.: 195,788

[22] Filed: Feb. 10, 1994

[30] Foreign Application Priority Data

Aug. 11, 1993 [JP] Japan ................................ 5-199699

[51] Int. Cl.$^6$ .................................................. A23L 1/00
[52] U.S. Cl. ........................................ 426/244; 426/508
[58] Field of Search ................................ 426/237, 244, 426/508; 99/451

[56] References Cited

U.S. PATENT DOCUMENTS

| | | | |
|---|---|---|---|
| 4,386,110 | 5/1983 | Komeyasu et al. | 426/237 |
| 5,034,236 | 7/1991 | Ohtsuki | 426/244 |
| 5,156,869 | 10/1992 | Otsuki | 426/237 |

FOREIGN PATENT DOCUMENTS

| | | |
|---|---|---|
| 386106 | of 0000 | Japan . |
| 061992 | 5/1981 | Japan . |
| 59-192077 | 10/1984 | Japan . |
| 61-58544 | 3/1986 | Japan . |
| 61-114015 | 5/1986 | Japan . |
| 042662 | 2/1988 | Japan . |
| 63-42655 | 2/1988 | Japan . |
| 013959 | 1/1989 | Japan . |

OTHER PUBLICATIONS

Patent Abstracts of Japan vol. 013 No. 187 (C–592) May 2, 1989.
Derwent Publications—AN 89–063672 Week 8909 1989.
Patent Abstracts of Japan vol. 012 No. 258 (C–513) Jul. 20, 1988.
Derwent Publications AN 88–089734 Week 8813 1988.
Patent Abstracts of Japan vol. 005 No. 124 (C–066) Aug. 11, 1981.
Derwent Publications AN 89–098136 Week 8913 1989.
H. Snyder "Soybean Utilization" 1987, AV1, N.Y.–USA pp. 218–221.

*Primary Examiner*—George Yeung
*Attorney, Agent, or Firm*—Ladas & Parry

[57] ABSTRACT

A process for preparing a bean jam is disclosed wherein adzuki beans or other beans and water are separately applied with high voltage negative electrons of 5,000 V to 20,000 V to separately produce treated beans with enhanced bean jam-producing properties and a treated water, the treated beans and the treated water are combined and heated to produce bean jam and stock, and the resulting bean jam is then removed from the stock.

8 Claims, 1 Drawing Sheet

5,455,056

PROCESS FOR PREPARING BEAN JAM

FIELD OF THE INVENTION

The present invention relates to a process for preparing a bean jam. More particularly, the present invention relates to a process for preparing a bean jam, in which adzuki bean (Vigna angularis) or the other beans including soybeans (referred to hereinafter as "adzuki beans") and water used for preparing bean jams are applied with high voltage negative electrons.

DESCRIPTION OF THE PRIOR ART

The operation for removing the astringent ingredients contained in adzuki beans has been conventionally conducted by washing the starting beans with water and repeating the cooking of the beans in a cooker. It is generally required for removing cyanic compounds contained in beans to soak the starting beans for at least four hours in warm water, to cook the beans for several hours and to refine the resulting bean jams in water at least three times. Soybeans have being unsuitable as a starting material for bean jams, because of having a high content of water-soluble ingredients. Moreover, they are not used entirely as the starting material, because of their having a peculiar beany flavor.

For producing bean jams of adzuki beans, a large amount of water is used, a high level of heat energy is lost accordingly, and a period of at least 4–6 hours is required for preparing one batch of bean jam, so that the daily production amount per unit is limited.

In addition, as the astringent ingredients of adzuki bean or the cyanic compounds cannot be removed sufficiently during the soaking and cooking steps, a large amount of water is also required for the refining step. However, criteria for discharging waste water has recently become severe and drainage from factories is restricted. It has also been considered impossible to remove astringent ingredients or cyanic compounds by using water and to remove the beany flavor even by soaking and cooking the soybeans according to the conventional method.

SUMMARY OF THE INVENTION

The present inventor has found that the above-mentioned problems can be solved by applying high voltage negative electrons without flowing entirely an electric current on red beans and water for preparing bean jam while a pole at a secondary higher voltage side of a high voltage electrostatic transformer is completely sealed and insulated and a high output resistance is provided at another pole, and affording activation energy to the adzuki beans and the water.

That is, while the astringent ingredients or cyanic compounds could not be removed sufficiently even by soaking adzuki beans in water at an ordinary temperature, it has become possible to remove astringencies such as tannin and gummy materials or cyanic compounds by using the adzuki beans or water activated according to the present process. When the present process is used to soybeans, not only is the beany flavor removed, but also the lees formed are reduced and the yield of bean jam may be improved.

According to the process of the present invention, the removal of the astringent ingredients or cyanic compounds, which could conventionally be done only incompletely, even at the latter step (cooking step), has been successfully done at the former steps (washing and soaking steps). Moreover, adzuki beans activated by the present process enhances extensively the heating efficiency, reduces the cooking period and decreases the cracking of the beans. It has thus become possible to manufacture economically and quickly the bean jam having an excellent and mild taste. Furthermore, it has been possible as the secondary effect to use the stock itself (soup) of the beans as a high quality "Shiruko" (stock), since the astringent ingredients or cyanic compounds can be completely removed at the former steps.

The adzuki beans and the water used according to the present invention is activated by the following treatment conditions. A high voltage electrostatic transformer is used, and a pole at a secondary higher voltage side is completely sealed and insulated, while another pole is connected to a plate or container of an electroconductive material which is completely insulated from the earth without flowing, entirely, any electric current. The plate or container of an electroconductive material is used as an electrode, with which the adzuki beans are brought into contact by filling them in the plate or container for applying a high electrostatic voltage.

As for the appropriate negative electron generating conditions in this case, the electric current at the primary side of the high voltage electrostatic transformer of 100 V is in the range from 0.02 A to 0.3 A per 1 $m^2$ of electrode, and the electric voltage at the primary side in the range from 5,000 V to 20,000 V is required. The application time is preferably in the range from 2 to 100 hours. While the plate or container of the electroconductive material used in the present invention is of metallic materials such as iron and stainless steel or carbon materials, the activation treatment of the present invention may be further improved particularly by coating the surface opposite to that contacting the starting adzuki beans with a non-electroconductive material such as plastic material. When a non-electroconductive container is used, it is also possible to conduct electronic treatment under the aforementioned condition by inserting an electroconductive material as an electrode in the starting adzuki beans.

In order to accomplish sufficiently the object of the present invention, it is necessary to conduct the activation treatment of not only the starting adzuki beans but also water used for the soaking of the beans and for manufacturing the bean jam. The activation treatment of the water is conducted by using a high voltage electrostatic transformer in the same manner as the activation treatment of the beans and applying negative electrons on a water tank. That is, when an electroconductive container which is completely insulated from the earth is filled with the water and connected to the aforementioned high voltage electrostatic transformer or when a non-electroconductive container is used, it is also possible to insert an electroconductive material plate as an electrode into the water in the same manner as the beans and to conduct treatment under the same condition as above. While the application condition is the same as the case of the beans, the application time of the water is desirably at least 8 hours. The treatment effect of the present invention may also be enhanced by removing chlorine and the like from the water.

Explanation of the symbols:
1. Apparatus for generating negative electrons by electrostatic induction;
2. Electron treatment tank and electroconductive part;
3. The beans such as adzuki beans and soybeans;
4. Insulating part;
5. Insulating container;
6. Water;
7. Electroconductive part;
8. Activated carbon tank.

DESCRIPTION OF THE PREFERRED EMBODIMENTS

The present invention is further described with reference to examples.

Figure 1:
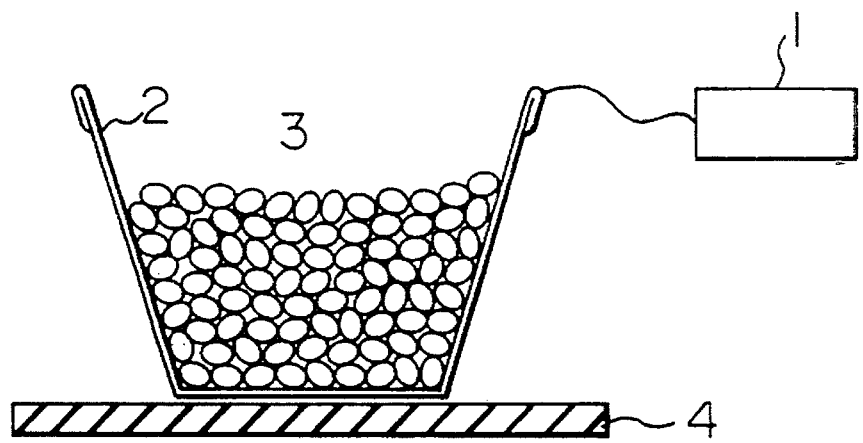
FIG. 1 is the cross-sectional view of the container into which the beans have been filled.
Figure 2:
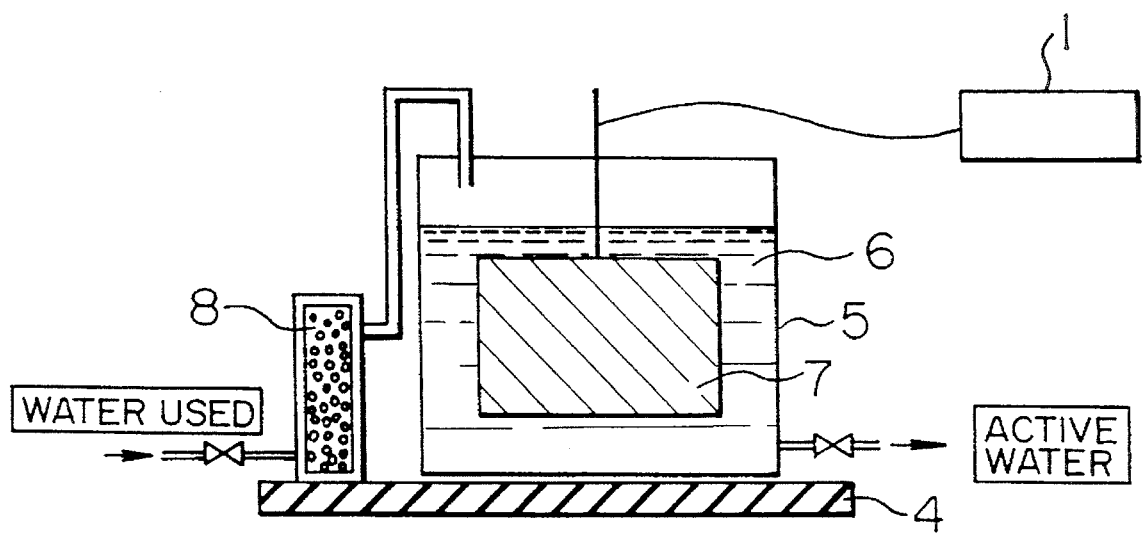
FIG. 2 is the sectional view of the apparatus for activating water used for preparing the bean jam.

As shown in FIG. 1, in preparing the examples, 30 kg of adzuki beans (domestic or Chinese strain), 40 kg of butter beans from Myanmer, 40 kg of baby Lima from the United States and 60 kg of soybeans from China were used, respectively, and were each charged in a stainless steel container on a plastic insulating pallet, and a pole of a high electrostatic transformer was connected to the container. The domestic beans were treated for 48 hours, the Chinese adzuki beans and soybeans for 72 hours, and the butter beans and the baby LIMA for 96 hours. Also, as shown in FIG. 2, a 1 $m^3$ amount of the water which had been passed through an activated carbon tank on a plastic insulating pallet was charged in a polyethylene container, a stainless steel plate as an electrode was provided in the water, and a pole of the high voltage transformer was connected to the electrode plate for conducting the treatment for 12 hours. The water has a pH value of 6.9 before the treatment and 7.5 after the treatment.

Example 1

The adzuki beans and/or the water treated as above and those without treatment were subjected to soaking test at room temperature. The amount of the water absorbed per 1 kg of the adzuki beans and the pH value of the water after soaking are shown in Tables 1 to 3.

TABLE 1

| | (1) Domestic adzuki beans (small) | | | | | |
|---|---|---|---|---|---|---|
| | 6 hours | | 12 hours | | 18 hours | |
| Soaking time | Amount of water absorbed | pH | Amount of water absorbed | pH | Amount of water absorbed | pH |
| Both beans and water treated | 80 | 6.2 | 690 | 6.0 | 1030 | 5.6 |
| Only beans treated | 70 | 6.7 | 520 | 6.3 | 830 | 6.0 |
| Only water treated | 70 | 6.8 | 560 | 6.5 | 930 | 6.0 |
| Neither beans nor water treated | 60 | 7.0 | 420 | 6.8 | 760 | 6.7 |

TABLE 2

| | (2) Domestic adzuki beans (large) | | | | | |
|---|---|---|---|---|---|---|
| | 6 hours | | 12 hours | | 18 hours | |
| Soaking time | Amount of water absorbed | pH | Amount of water absorbed | pH | Amount of water absorbed | pH |
| Both beans and water treated | 70 | 6.4 | 500 | 6.3 | 980 | 5.8 |
| Only beans treated | 60 | 6.8 | 400 | 6.6 | 870 | 6.1 |
| Only water treated | 65 | 6.7 | 410 | 6.5 | 880 | 6.2 |
| Neither beans nor water treated | 50 | 6.9 | 330 | 6.8 | 680 | 6.6 |

TABLE 3

| | (3) Chinese adzuki beans | | | | | |
|---|---|---|---|---|---|---|
| | 6 hours | | 12 hours | | 18 hours | |
| Soaking time | Amount of water absorbed | pH | Amount of water absorbed | pH | Amount of water absorbed | pH |
| Both beans and water treated | 130 | 6.2 | 880 | 6.0 | 1400 | 5.6 |
| Only beans treated | 110 | 6.6 | 720 | 6.3 | 1180 | 5.9 |
| Only water treated | 110 | 6.8 | 760 | 6.4 | 1230 | 5.8 |
| Neither beans nor water treated | 90 | 6.9 | 600 | 6.6 | 1020 | 6.2 |

Example 2

A 30 kg amount of the domestic adzuki beans (small) was soaked in 60 liters of the treatment water for 12 hours. The beans were then taken out and placed in a cooker to cook with 45 liters of the treatment water for 13 minutes. Removal of the soup gave 7.6 kg of a grained bean jam. The grained bean jam had a good texture, of no astringency and rich in the sweetness and flavor of adzuki beans. Besides, the soup could be used as a high quality shiruko soup.

Similarly, beans jams were prepared with the treatment of adzuki beans, the treatment of only water and the treatment of both beans and water under the same conditions as above.

TABLE 4

| Soaking time | Cooking time (min) | Yield of bean jam (kg) | Sugar content of bean jam (bx) | Astringency | Color |
|---|---|---|---|---|---|
| Both adzuki beans and water treated | 13 | 76 | 8 | none | purplish gray |
| Only beans treated | 16 | 73 | 4 | scarecely any | gray |
| Only water treated | 15 | 74 | 5 | scarecely any | gray |
| Neither beans nor | 25 | 68 | 2 | notable | brownish gray |

TABLE 4-continued

| Soaking time | Cooking time (min) | Yield of bean jam (kg) | Sugar content of bean jam (bx) | Astringency | Color |
|---|---|---|---|---|---|
| water treated | | | | | |

(Sugar content was measured with a saccharimeter.)

(2) Bean jam was prepared under the same conditions except that the domestic adzuki beans (small) in (1) were replaced by the Chinese beans.

TABLE 5

| Soaking time | Cooking time (min) | Yield of bean jam (kg) | Sugar content of bean jam (bx) | Astringency | Color |
|---|---|---|---|---|---|
| Both adzuki beans and water treated | 23 | 68 | 6 | none | purplish gray |
| Only beans treated | 38 | 62 | 4 | a little | gray |
| Only water treated | 42 | 61 | 4 | scarecely any | gray |
| Neither beans nor water treated | 85 | 50 | 2 | notable | brownish gray |

Example 3

(1) A 40 kg amount of the butter beans from Myanmer treated as above was soaked in 80 liters of the treated water for 12 hours. The butter beans were placed in a cooker, cooked with 60 liters of the treated water before removing the astringent ingredients once and further cooked with 60 liters of the treated water for 30 minutes. Similarly, beans jams were prepared with non-treated butter beans and non-treated water under the same conditions as above.

TABLE 6

| Amount of residual cyanic compounds (ppm) | After soaking | After once removing astringency | After cooking |
|---|---|---|---|
| Treated products | 7 | undetectable | undetectable |
| Non-treated products | 250 | 210 | 75 |

(The amount of the cyanic compounds of the butter beans is 360 ppm.)

(2) Tests were conducted under the same conditions except that the butter beans in (1) were replaced by the baby LIMA (US product).

TABLE 7

| Amount of residual cyanic compounds (ppm) | After soaking | After once removing astringency | After cooking |
|---|---|---|---|
| Treated products | 6 | undetectable | undetectable |
| Non-treated products | 220 | 180 | 30 |

TABLE 7-continued

| Amount of residual cyanic compounds (ppm) | After soaking | After once removing astringency | After cooking |
|---|---|---|---|

(The amount of the cyanic compounds of the baby LIMA is 320 ppm; the cyanic compounds are detected by the ion electrode method.)

As is apparent from the examples, it is considered that when the adzuki beans and the water are treated according to the process of the present invention, the cells of the beans themselves are activated, and the clusters of water molecules are decreased to increase soaking power into the raw material, so that the aforementioned advantageous effects are accomplished. However, the mechanism thereof cannot be precisely understood.

It is found from the data shown in Tables 1 to 3 that the treated products absorb water more rapidly and in a larger amount as compared with the non-treated products. Furthermore, the drop of pH is caused by the leaching of acids in the beans.

It is found from the data shown in Tables 4 and 5 that judging from no astringency and the color of the bean jam made of the treated products, tannin, gummy materials in seeds and seed leaves and the other materials which impair the flavor have been completely bled out with water at room temperature. Moreover, the heating ability and the thermal conductivity of the beans were improved, so that the cooking time was successfully reduced to about ½–¼ time with increasing the yield of the bean jam by 12%–38% and the sugar content to three or four times.

It has been found from the data shown in Tables 6 and 7 that 98% or more of the cyanic compounds in butter beans or baby LIMA have been removed by soaking into water at room temperature. After the astringent ingredients have been once removed, no cyanic compounds were detected. However, the astringent ingredients were removed by only 30% from the non-treated product, and the cyanic compounds could not be extracted with water at room temperature. As a conclusion, while better results can be obtained by applying high negative electron on only the adzuki beans or the water as compared with the conventional method as shown in Tables 1 to 7, it is more preferable to conduct the treatment of both the beans and the water.

Example 4

After 60 kg of soybeans from China treated as above were soaked in 20 liters of the treated water for 10 hours, the beans were charged in a cooker and cooked with 180 liters of the treated water for 4 minutes. After removing the soup formed on cooking therefrom, the beans were ground with a masher while adding an appropriate amount of the activated water and then separated into the bean meat and skin with a separator. The mashed jams of the soybean were prepared from the resulting content according to the conventional method. The jams had no beany flavor, had a viscous texture and were rich in sweetness. In addition, only a small amount of lees was formed.

Similarly, soybean jams were prepared with the treatment of only soybeans, the treatment of only water and no treatment of both beans and water under the same conditions as above.

TABLE 8

| | Cooking Time (min) | Yield of Jam (kg) | Amount of Lees (kg) | Beany flavor | Color |
|---|---|---|---|---|---|
| Both soybeans and water treated | 10 | 120 | 15 | None | Creamy white |
| Only beans treated | 16 | 100 | 65 | A little | Creamy yellow |
| Only water treated | 14 | 105 | 60 | A little | Creamy yellow |
| Neither beans nor water treated | 25 | 75 | 150 | Notable | Yellow |

As is shown in Table 8, the cooking time with the treatment of both soybeans and water lowers to half or less than that with non-treatment and yield of the jams resulted in an extraordinary 60% increase. In addition, the amount of the lees was $1/10$. That is, it appears that the skin of the soybeans was very much softened by activating the starting beans and water to obtain a jam component, and accordingly only the hard portion remains as the lees which are not viscous and dry to the touch.

Recently, treating such lees of Tofu curd constitutes a social problem in their utility, because of having a high moisture content, but the lees formed by the present process have relatively low moisture of about 65% and a long shelf life. The products according to the present invention have no beany flavor and may be utilized for various food products. Moreover, they are utilizable as a white bean jam in view of their color and sweet taste as well.

What is claimed is:

1. A process for preparing a bean jam which comprises applying separately to adzuki beans or other beans and to water high voltage negative electrons of 5,000 V to 20,000 V to separately produce treated beans with enhanced bean jam-producing properties and a treated water, said high voltage negative electrons being produced by preventing flow of electric current by providing at a first pole a means for producing a high output resistance and providing a second pole at a secondary higher voltage side of a high voltage electrostatic transformer that is completely sealed and insulated; combining the treated beans with the treated water; heating the combination of treated beans and treated water to produce bean jam and stock and removing the bean jam from the stock.

2. The process according to claim 1 wherein the high voltage negative electrons are applied to the beans for 2–100 hours.

3. The process according to claim 1 wherein the high voltage negative electrons are applied to the water for at least 8 hours.

4. The process according to claim 1 wherein after application of the high voltage negative electrons, the beans are soaked in said treated water for 6–12 hours.

5. The process according to claim 1 wherein the application of the high voltage negative electrons is carried out at room temperature.

6. The process according to claim 1, wherein the other beans comprise soybeans.

7. The process according to claim 1 wherein the beans are heated sufficiently to cook the beans.

8. The process according to claim 1 wherein after the bean jam is removed from the stock, the bean jam is mashed.

* * * * *